US005235516A

United States Patent [19]

Ellis, Jr. et al.

[11] Patent Number: 5,235,516

[45] Date of Patent: Aug. 10, 1993

[54] ELECTRONIC CREEL MAPPING

[76] Inventors: Joseph F. Ellis, Jr., 375 Panarama Dr., Marion, Va. 24353; Lynn R. Lease, 2305 Moultrie Rd., Camden, S.C. 29020

[21] Appl. No.: 948,609

[22] Filed: Sep. 22, 1992

Related U.S. Application Data

[63] Continuation of Ser. No. 525,061, May 18, 1990, abandoned.

[51] Int. Cl.[5] .......... G06F 15/46

[52] U.S. Cl. .......... 364/470; 242/131

[58] Field of Search .......... 364/470; 112/80.1, 121.11, 112/121.12, 266.2; 242/131, 131.1

[56] References Cited

U.S. PATENT DOCUMENTS

| | | | |
|---|---|---|---|
| 3,875,883 | 4/1975 | Eberwein etal. | 112/80.4 |
| 4,515,328 | 5/1985 | Payne, Jr. | 242/35.5 |
| 4,821,504 | 4/1989 | Shinkai et al. | 242/35.5 |
| 4,832,281 | 5/1989 | Payne, Jr. et al. | 242/18 PW |
| 4,835,699 | 5/1989 | Mallard | 364/470 |
| 4,867,080 | 9/1989 | Taylor et al. | 112/266.2 |
| 4,893,250 | 1/1990 | Sainen | 364/470 |

FOREIGN PATENT DOCUMENTS

| | | |
|---|---|---|
| 2576435 | 9/1986 | France . |
| 61-6336 | 1/1986 | Japan . |

*Primary Examiner*—Jerry Smith

*Assistant Examiner*—Thomas E. Brown

[57] ABSTRACT

A method for identifying each yarn in a fabric. Barcoded tracer tapes in yarn packages are placed on a creel, similarly the creel position associated with the package is read and transmitted to a PC memory. The computer calculates the age of each package and the difference between the oldest and youngest packages and signals the operator whenever any package exceeds a predetermined difference. Nonuniformities in carpet may then be traced back to creel position, yarn package and conditions under which the yarn was made.

2 Claims, 14 Drawing Sheets

ELECTRONIC CREEL MAPPING

This is a continuation, of application Ser. No. 07/525,061 filed May 18, 1990, now abandoned

BACKGROUND OF THE INVENTION

This invention relates to a method for identifying the source of each yarn in a fabric made on a machine for the purpose of tracing fabric nonuniformities back to the yarn and its manufacturing conditions.

A number of different textile operations involve feeding multiple yarns from individual yarn packages into a tufting, knitting, or weaving operation. If the properties of such yarns vary, for example, in dyeability, the variation is seen in the fabric as a streak. However, the fabric may not be dyed for several days after it is formed and, by the time that the nonuniformity is detected, a large amount of additional fabric may have been made from unsatisfactory yarn. Furthermore, by this time the faulty yarn has lost its identity and cannot be traced back to the spinning machine position on which it was made so that the reason for the off-standard property cannot be determined and corrected.

SUMMARY OF THE INVENTION

A method for correcting the above difficulties has now been developed wherein each yarn package is identified as it is made by such means as a bar-coded label containing information on the machine position, the time of day when it was made, etc. which is entered in a computer memory containing records of the significant machine process conditions existing when the package was made. At a later time and different location, each yarn package is placed on a creel feeding multiple yarns to an operation such as tufting, knitting or weaving and its identity is entered in a computer memory along with its creel position. This may be accomplished, for example, by a portable laser scanner bar code reader which reads the package label and a bar code on the associated creel position. The bar code reader may transmit its information to the computer memory by wire, by radio frequency, or other means. The fabric made from these yarns is identified with the packages and creel positions being used at the time that it was made. If the fabric is later found to contain a yarn with off-standard properties, its distance from the fabric edge correlates with its creel position. The computer then identifies the package which was on the particular creel position when the fabric was made, and a further search of the process condition records helps to detect what caused the problem.

The computer memories for the spinning machine process conditions used to manufacture yarn and for the creel may be two separate systems or they may be linked or may be different portions of a single system. If the systems are separate, information may be conveyed from one to the other by floppy disc or alternative. Instead of being identified by bar code, each package may be identified by a magnetic stripe which is read by a machine reader. Then the package may be identified with its creel position magnetically as the package is slipped onto the creel, the information being transmitted by wire or radio frequency from the creel position to the computer.

This invention may be used in additional ways to avoid nonuniformity problems. For example, some properties of yarns change with time, with exposure to atmospheric pollutants and with variations of humidity. When the creel computer is able to read the ages of packages as they are placed on the creel, it can be made to signal the creel operator when a package significantly older or younger than the average of a yarn lot is placed on the creel. The system may also be programmed to notify the operator that certain creel positions have not had a new package installed despite too much product having been produced since the last package change, thus maintaining accuracy of the data base.

DETAILED DESCRIPTION OF THE PREFERRED EMBODIMENT

Figure 1:
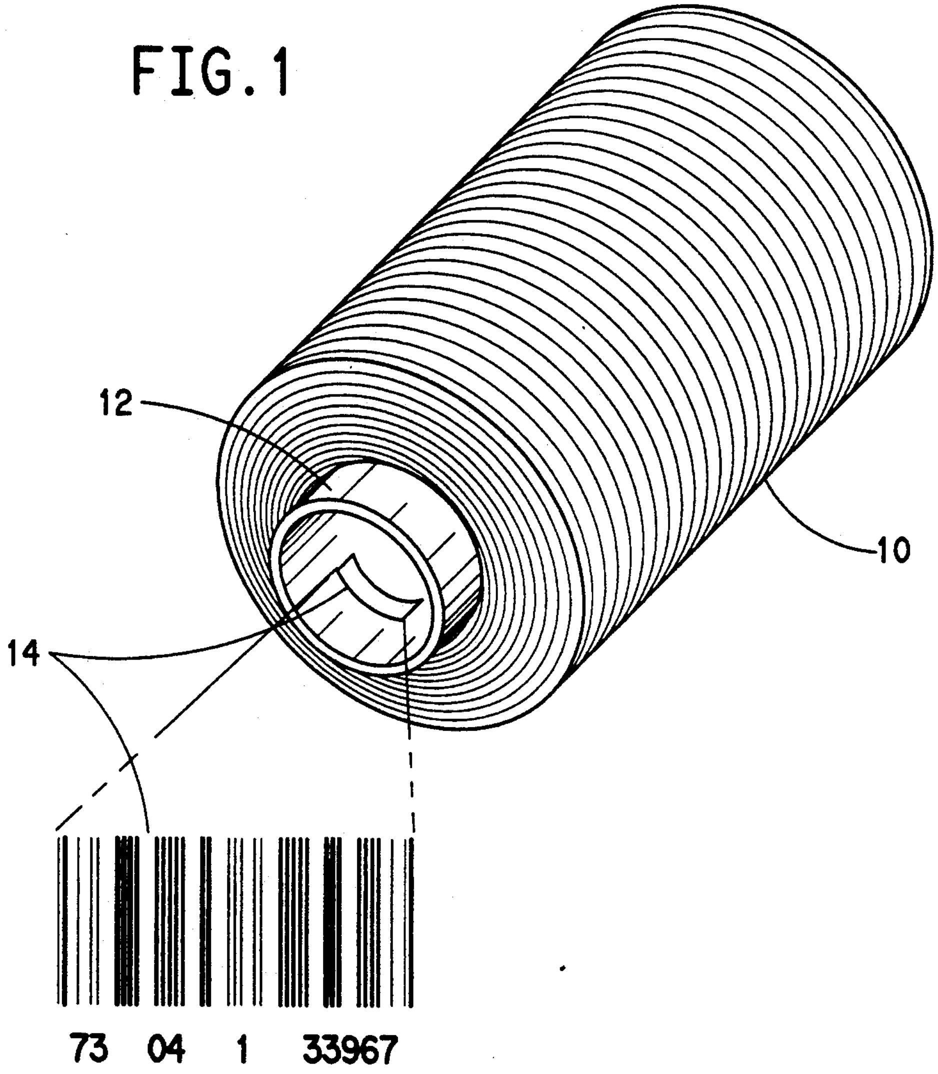
FIG. 1 is a schematic perspective view of a yarn package wound on a bobbin with a bar code tracer tape fastened inside the bobbin.

Referring now to FIG. 1, a yarn package 10 is shown would on a bobbin 12. A tracer tape 14 is adhered to the inner surface of bobbin 12. The tracer tape contains a bar code and its human readable equivalent. The code refers to the file in the data base that contains information as follows: starting from the left of the tape, the first two digits are the spinning machine number on which the yarn was spun, the next two digits are the spinning position, the next digit is the threadline number, and the last five digits indicate the age of the package.

Figure 2:
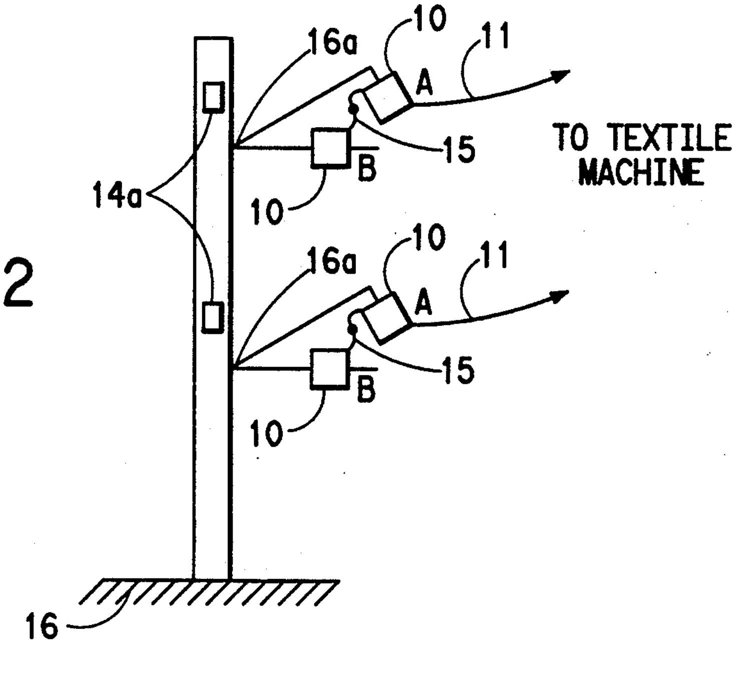
FIG. 2 is a schematic elevation view of a creel with yarn packages in place with bar code tracer tapes on the creel to identify creel position.

In FIG. 2 a textile creel 16 is shown with yarn packages 10 mounted on the running position A and back up position b on each position 16*a* of the creel. Transfer tails 15 of yarn packages in the running position A are tied to the outside ends of yarn packages 10 in the backup position B of each position. The leading end 11 of the yarn package in the running position A is then fed to a textile machine in a textile mill for making fabric.

Figure 3:
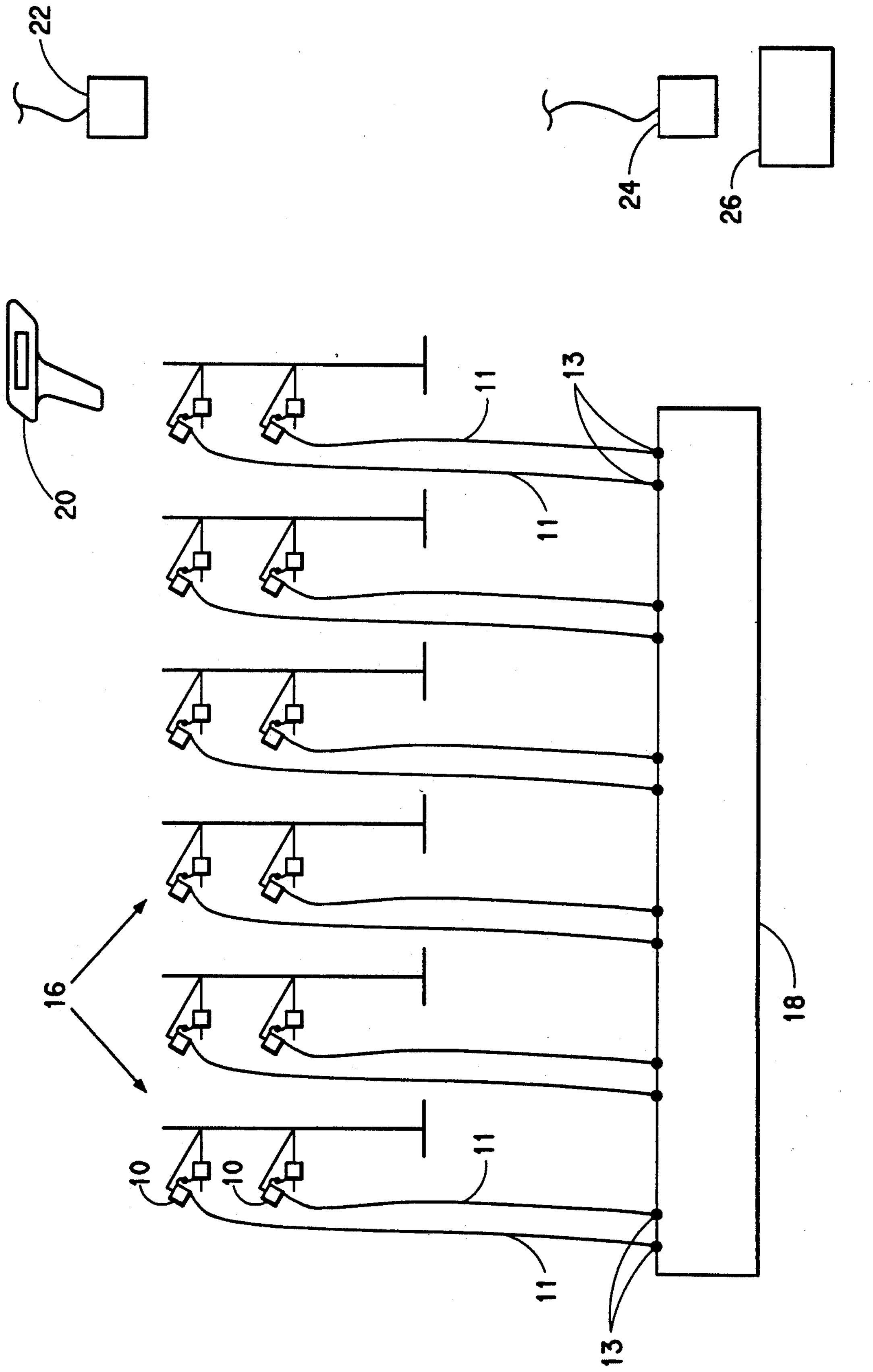
FIG. 3 is a schematic drawing of the invention showing how yarn from specific creel positions is fed to specific needles of the textile machine. The hand-held scanner, radio data terminal, base radio station and host computer are also shown
Figure 4A:
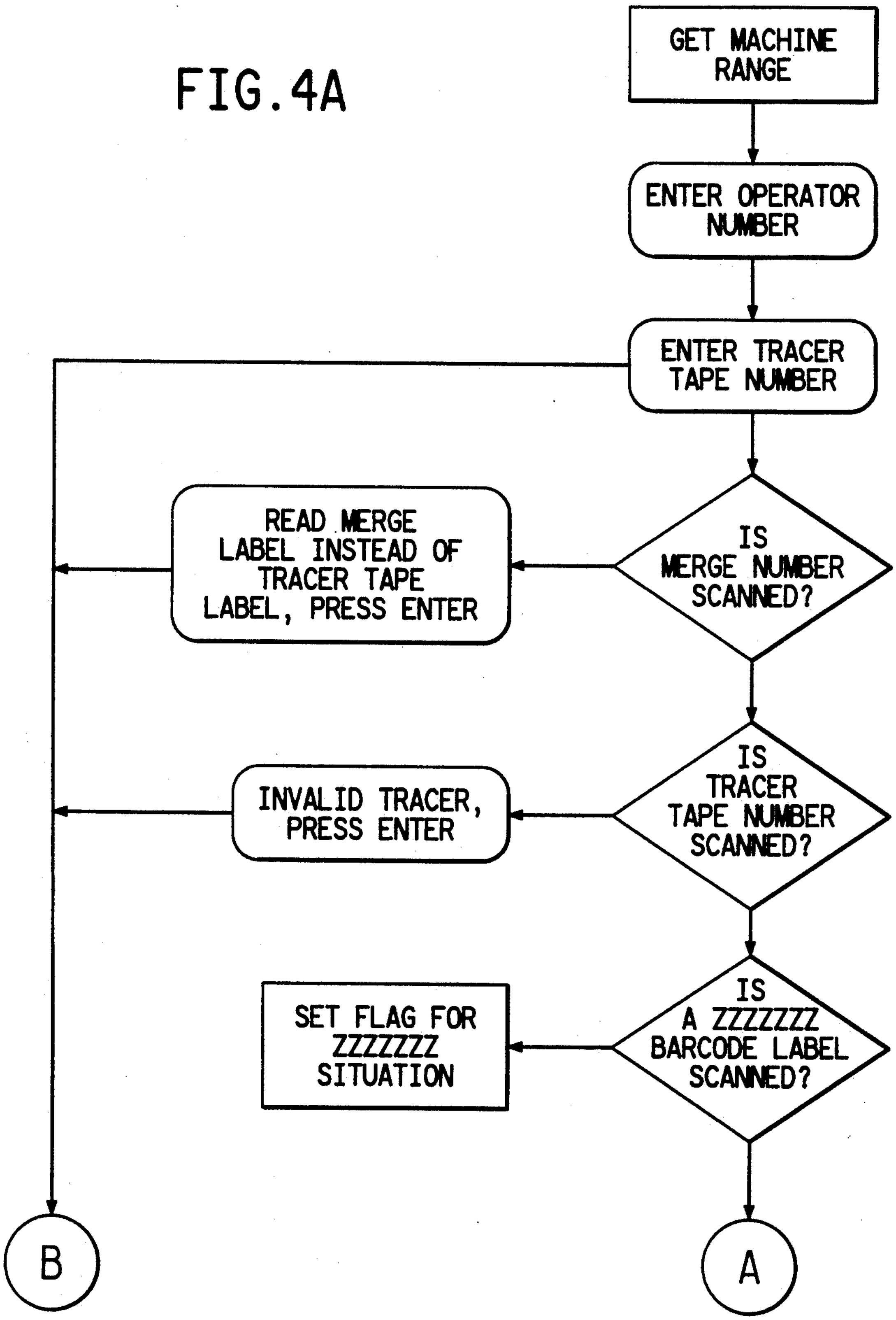
FIGS. 4*a*, 4*b*, 5*a*, 5*b*, 6, 7*a*, 7*b*, 8, 9, 10*a*, 10*b*, and 11 are logic flow diagrams of the computer operating routines of the invention.
Figure 4B:
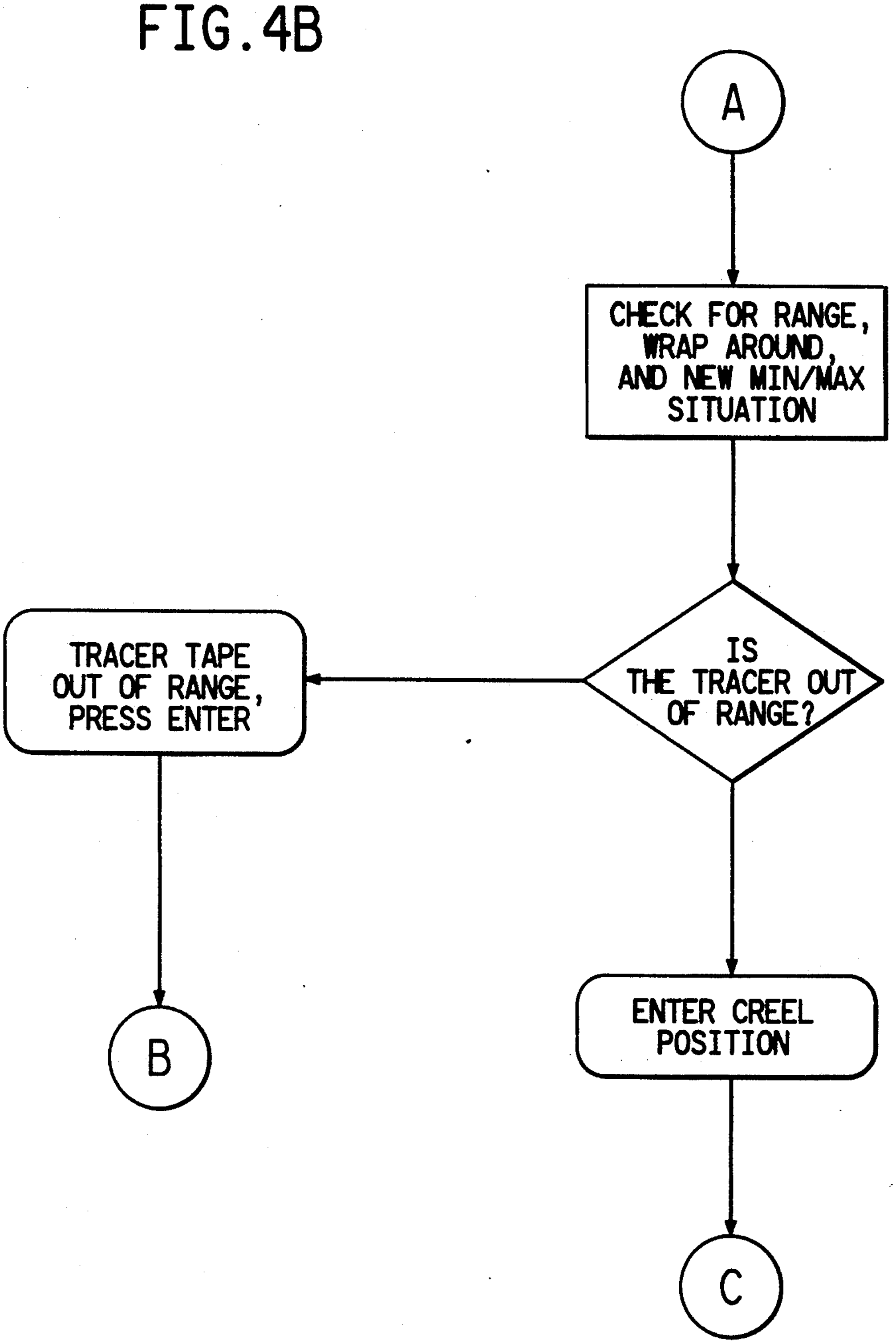
Figure 5A:
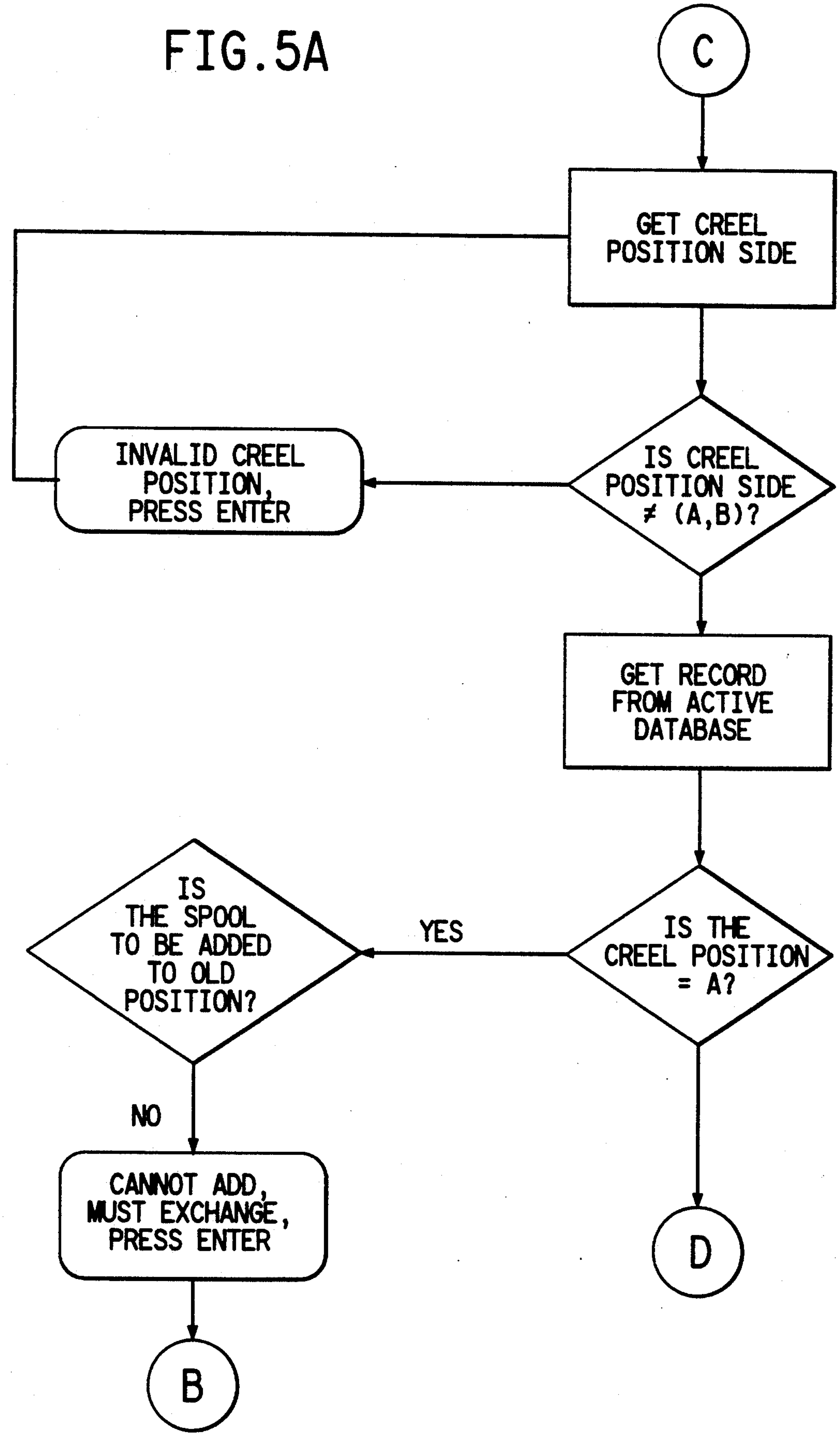
Figure 5B:
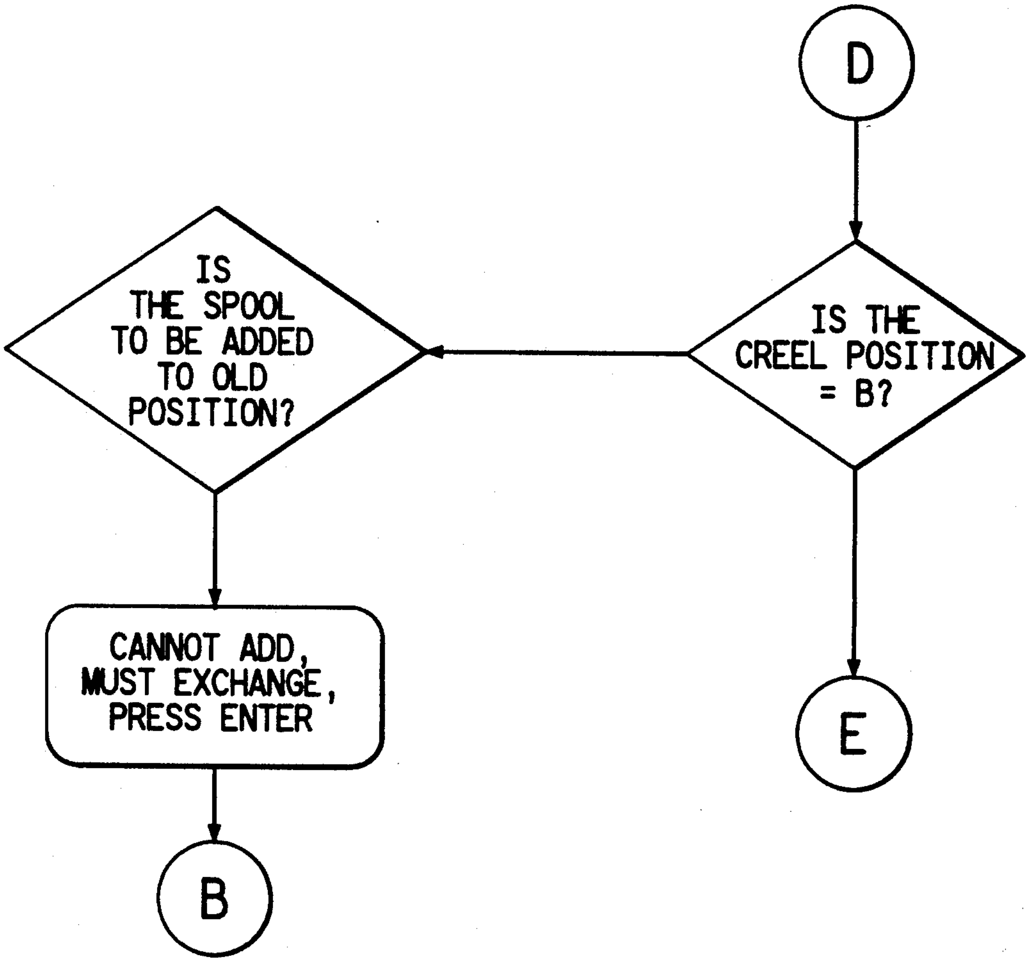
Figure 6:
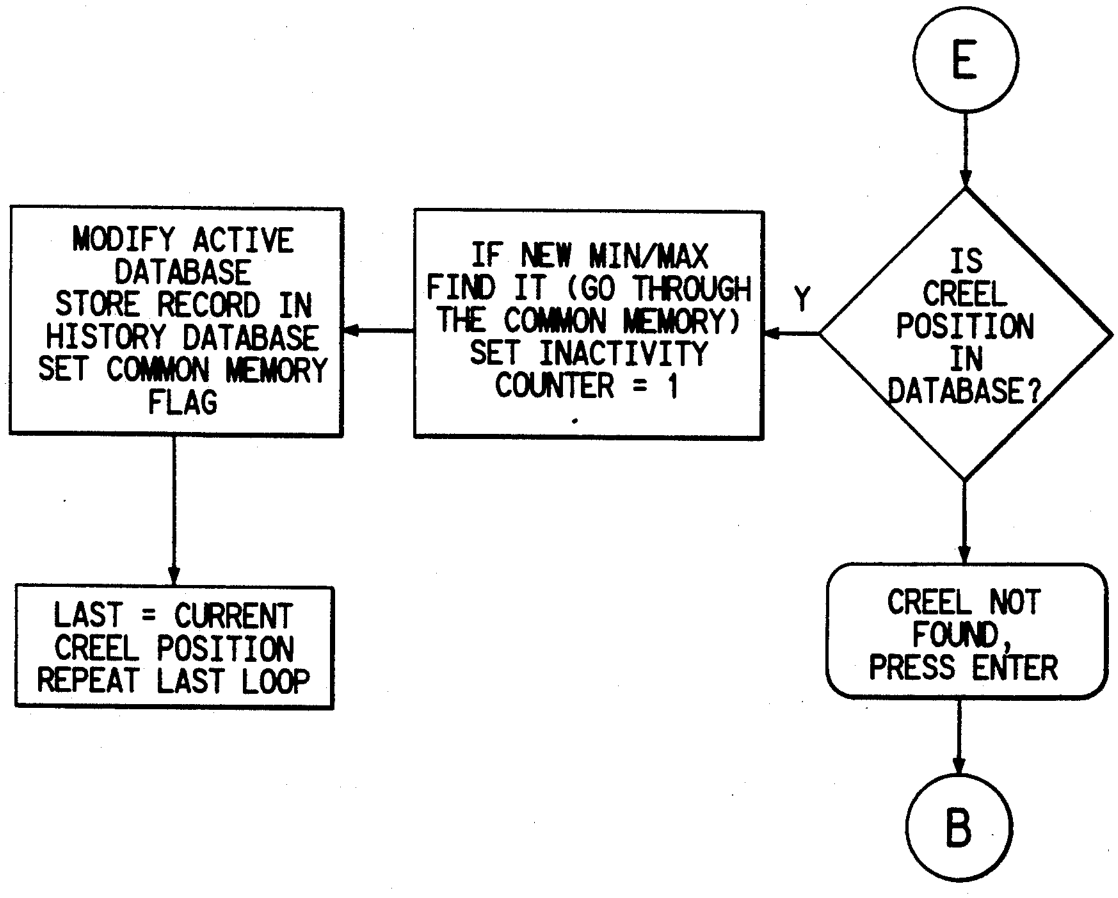

As best shown in FIG. 3, the leading ends 11 from yarn packages 10 are fed to specific needles 13 located along the textile machine 18. A portable laser scanner bar code reader 20 is used to read labels 14, 14*a* on the package bobbins and the creel positions, respectively. Radio data terminal 22 transmits information received from reader 20 to base radio station 24 and can receive from station 24 as well. The base radio station 24 is interfaced with the host computer 26 which contains the textile mill data base.

The generic name and manufacturer of the aparatus units specified for the preferred embodiments are listed below:

| Element No. | Generic Name | Model No. | Manufacturer |
|---|---|---|---|
| 18 | Tufting Machine | 41900386 | Tuftco Corp. Chattanooga, TN 37404 |
| 20 | Portable | LS7000 | Norand Corp., Inc. |

-continued

| Element No. | Generic Name | Model No. | Manufacturer |
|---|---|---|---|
| | Reader | | Cedar Rapids, IA 52401 |
| 22 | Radio Data Terminal | RT2210 | Norand Corp., Inc. |
| 24 | Base Radio Station | RT2212 | Norand Corp., Inc. |
| 26 | Computer | Micro Vax II | Digital Equipment Corp., Inc. Woburn, MA 01801 |

In operation and referring to FIGS. 1–6, the yearn manufacturer places a unique bar code tracer tape 14 on each yarn package 10. The tracer tape bar code number identifies the age of the yarn. Optionally, the yarn manufacturer may perform various analytical tests on the yarn and store that information in his data base along with the yarn age and the bar code number of the yarn. Yarn packages are then shipped to a mill to be tufted into carpet.

When mill operators log onto the computer 26, the main menu is displayed. The operator must enter the following information before using the system:

1. Set the age range of yarns which are acceptable. Age range is equivalent to the maximum minus the minimum acceptable yarn tracer tape numbers 14. This is done once and stays until changed.
2. Set the active and common memory area to a known state, i.e., determine which textile machine to use.
3. Supply the required grade entries (carpet style). These grades identify starting and ending tufter needle numbers for each carpet strip.
4. Set the machine to the style of carpet to be made.
5. Input to the computer which creel positions will not have yarn packages on them. This is done by reading a special "ZZZZ" tape number into the data base.
6. Start the radio communications 24.
7. Start the radio terminal 22.

Figure 7A:
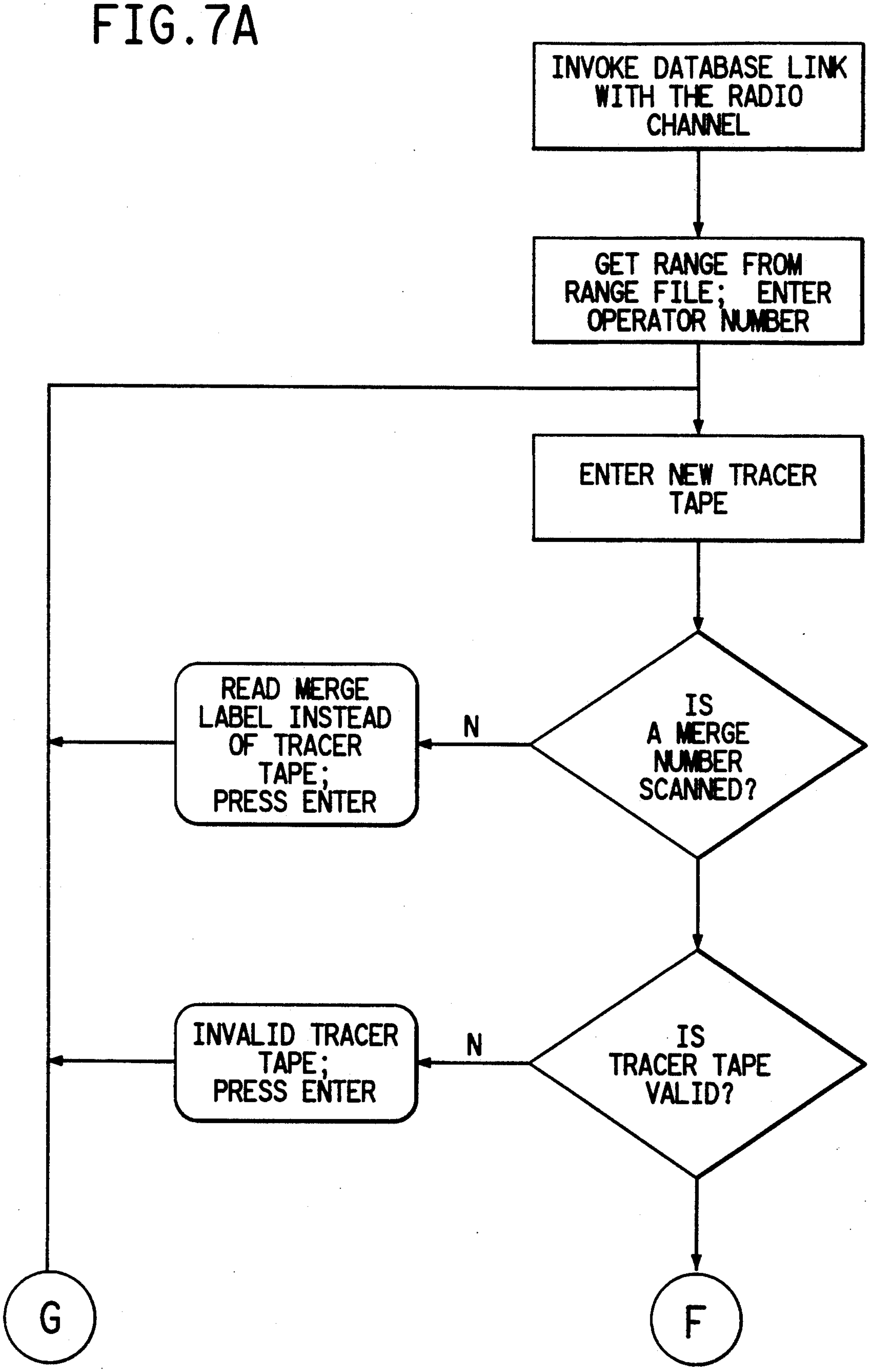
Figure 7B:
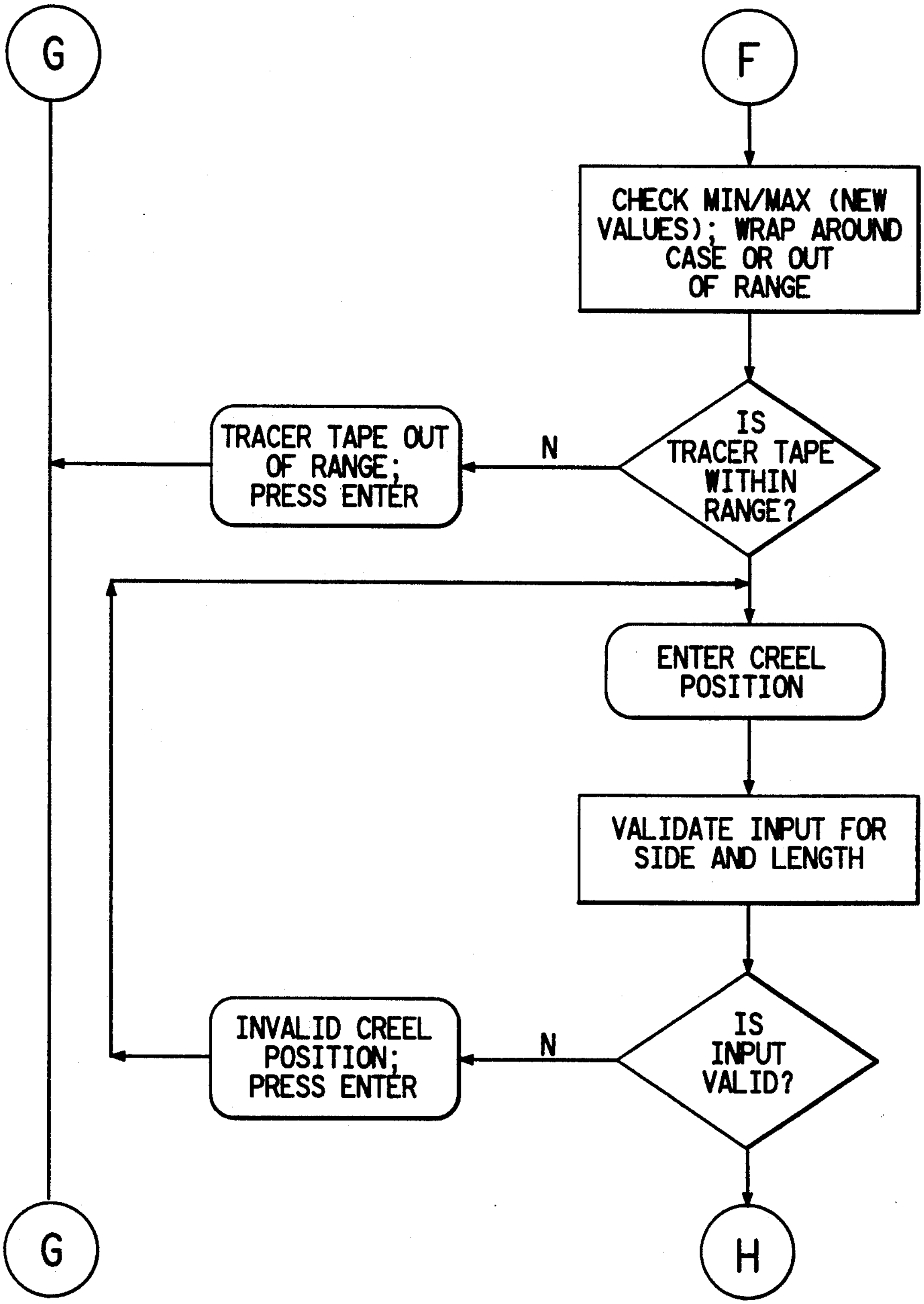
Figure 8:
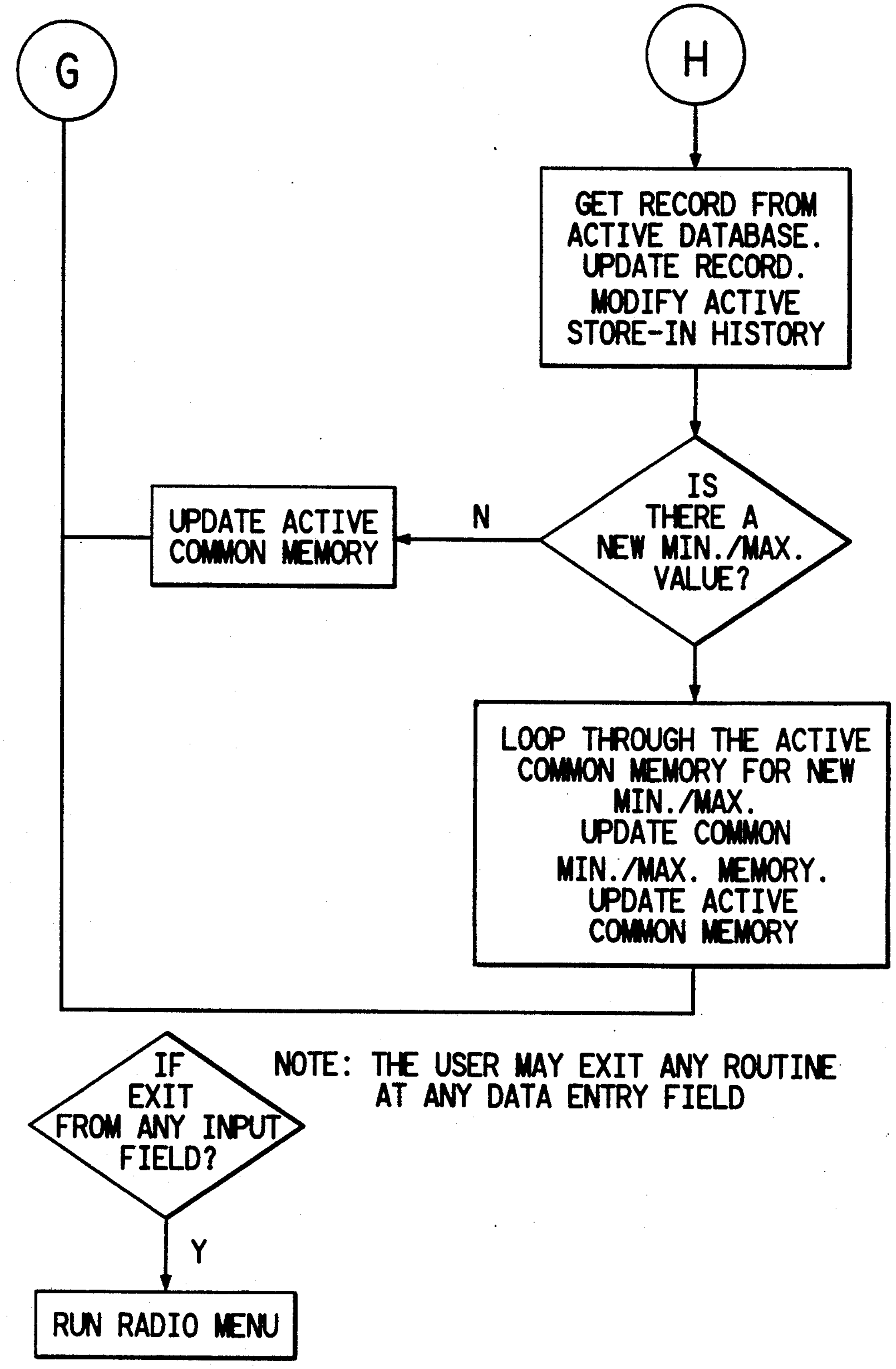
Figure 9:
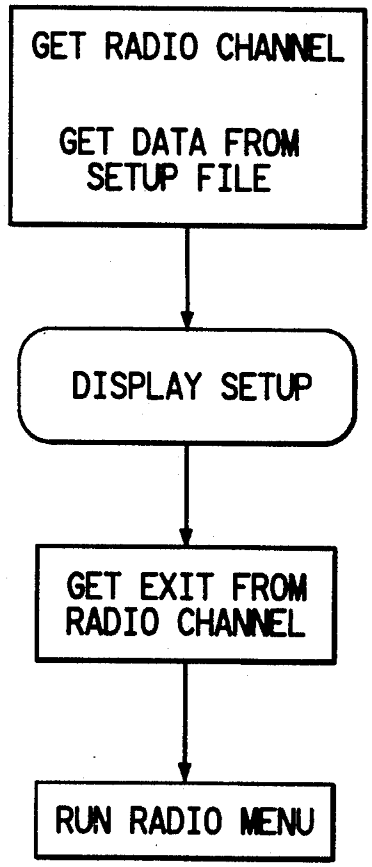
Figure 10A:
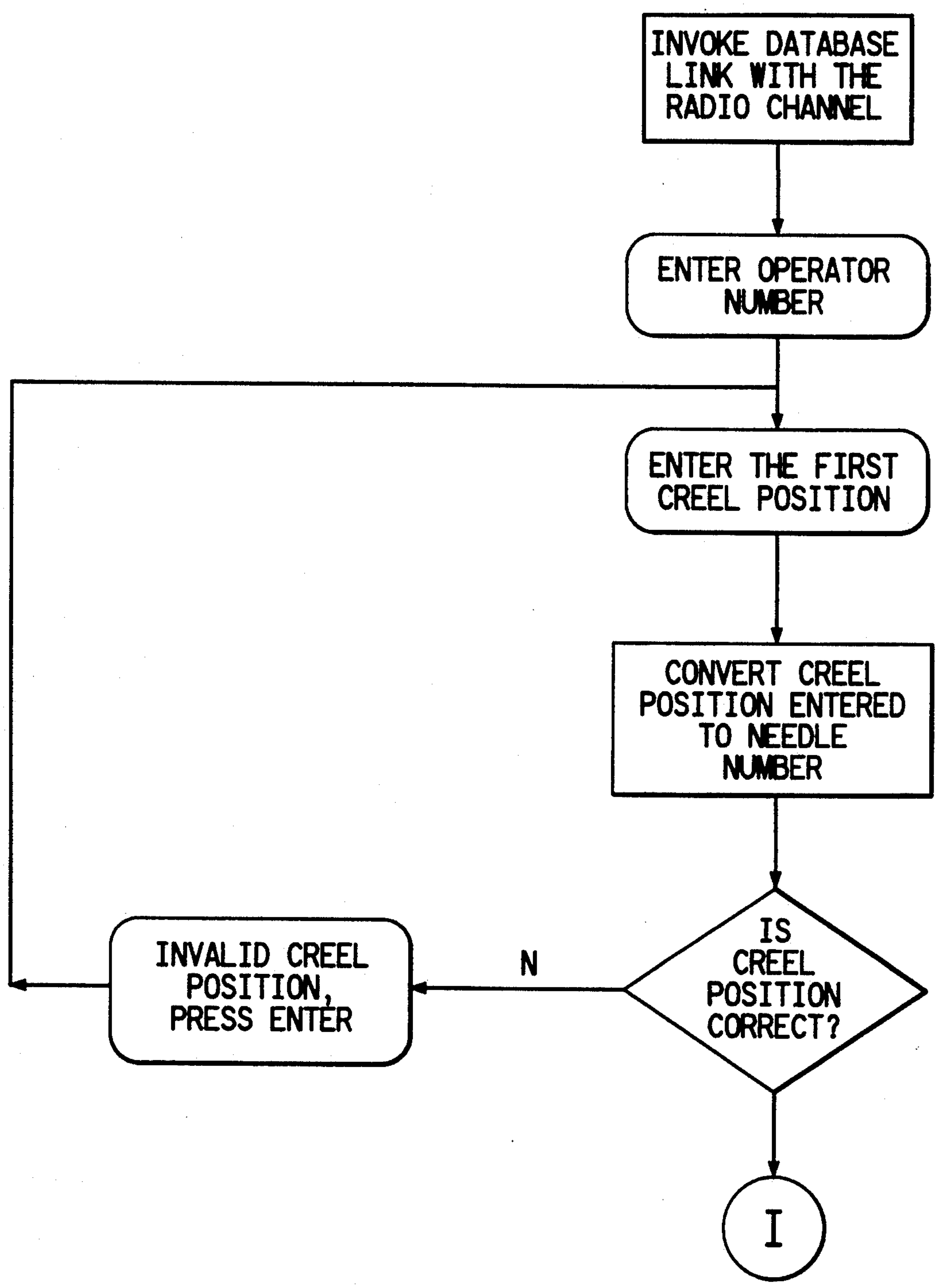
Figure 10B:
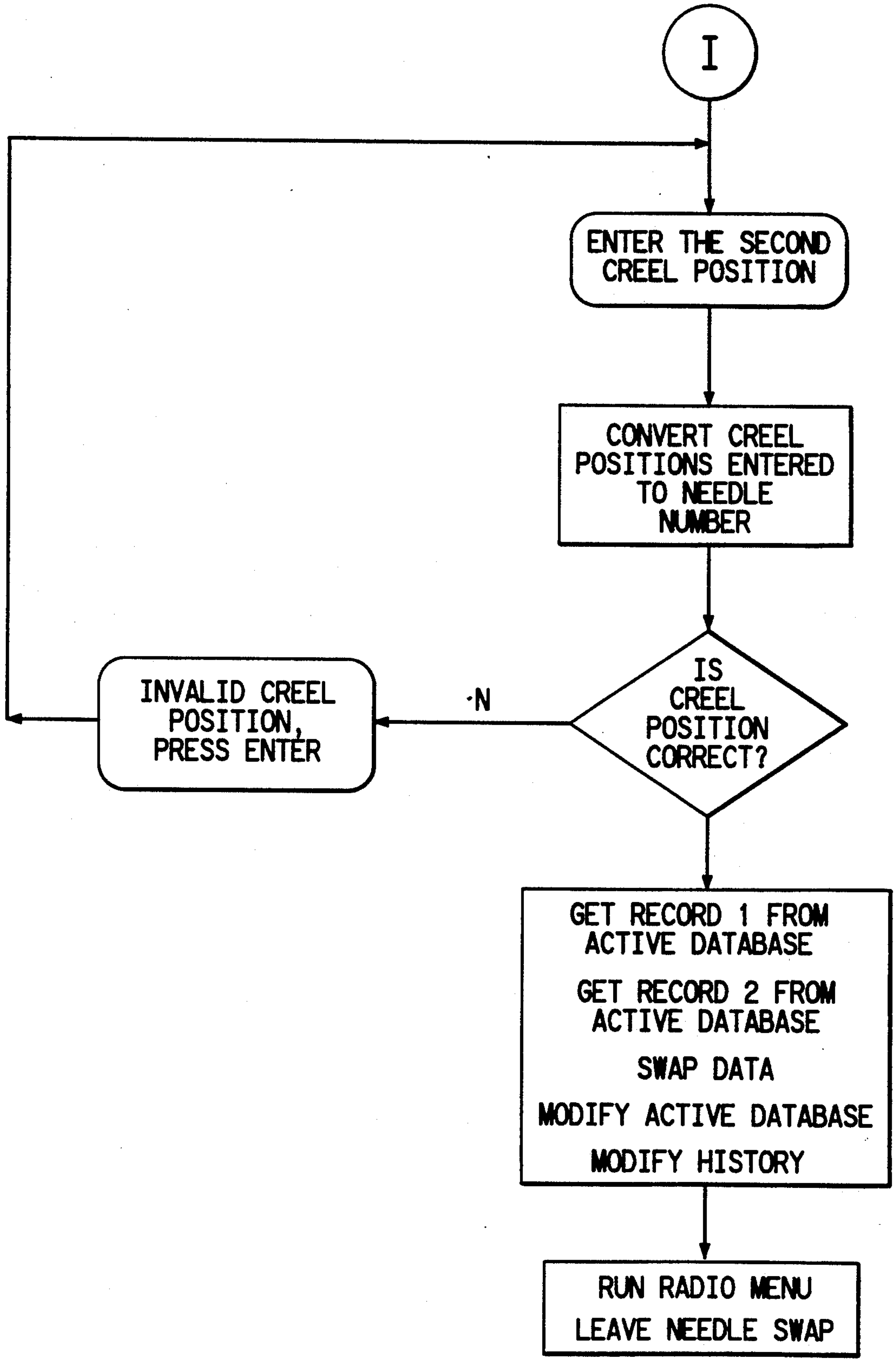
Figure 11:
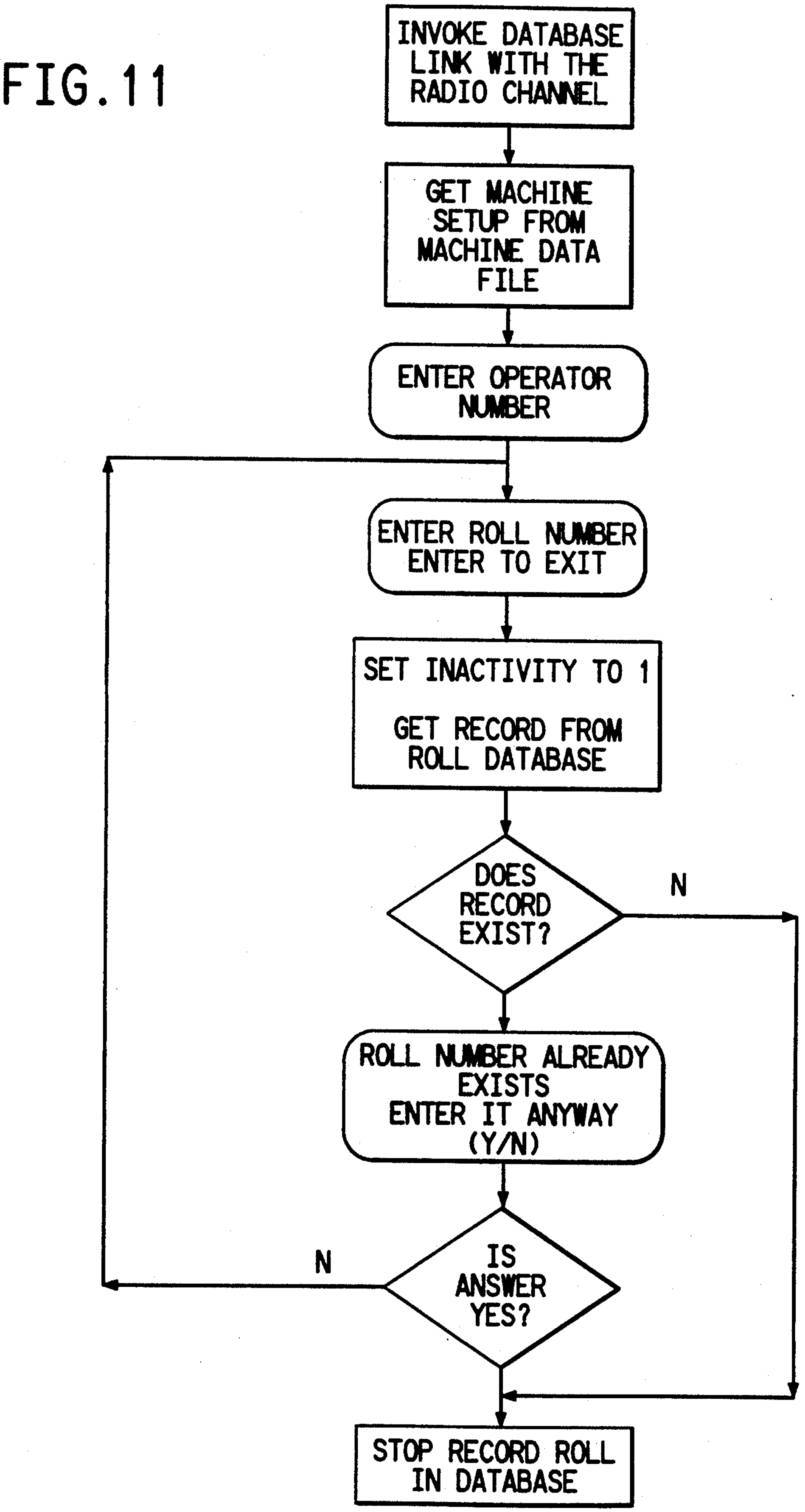

The radio terminal 22 allows the operator to either:

1. Read creel (FIGS. 4–6)
2. Exchange (FIGS. 7–8)
3. Set-up (FIG. 9)
4. Needle swap (FIG. 10)
5. Assign roll number to the carpet (FIG. 11)

In order to initially load yarn 10 onto the creels 16, the operator selects the Read Creel option (FIGS. 4–6) on the radio terminal 22. He uses the hand-held bar code reader 20 to first scan the yarn package bar code 14 and then the bar code 14a of the creel arm (A or B, FIG. 2) where the yarn is placed. Bar code tracer tapes on the creel 14a identify the creel's location around the tufting machine 18, the creel arm (A or B) onto which the yarn package is placed and the creel post and position (one of six arm sets). The computer 26 keeps track of the age of the yarn packages and if the yarn bar code is outside the preset age range, the operator is prompted by an error message at the hand-held reader to use another yarn package. At each creel position, yarn is first placed onto arm A and then onto arm B. Yarn on arm A is the feed yarn and yarn on arm B is the backup yarn. The transfer tails 15 of the feed yarn packages are tied to the outside of the backup yarn packages. The computer 26 keeps track of where yarn packages are located and if the operator inadvertently puts a package on an arm B before he puts a package onto an arm A, he is notified at the hand-held reader to run the Exchange option on the radio terminal 22. The operator must also run the Exchange option if he loads two A or two B arms sequentially.

The Exchange option (FIGS. 7–8) allows the operator to move the yarn package to the correct arm (A or B) and update the computer 26 data base. Once in the Exchange option, the operator scans the bar code of the offending yarn package and then scans the bar code of the correct creel arm (A or B) and places the yarn onto the correct arm. The operator then returns to the Read Creel option and finishes loading the creels. The Exchange operation also allows a continuous operation of the creel. When packages are empty, they are replaced with new ones and "Exchange" is used to update the computer data base.

The Set-up option (FIG. 9) on the radio terminal 22 allows the creel operator to see the tufting machine settings (stored in the computer 26) so that he knows which creel positions to leave empty for this particular carpet and also which creel position should feed a given needle 13 on the tufting machine 18.

In the event that the operator strings the wrong creel position to a needle, he does not have to restring the yarn. Instead, he can use the Swap Needle option (FIG. 10) on the radio terminal 22 to update the computer records.

The operator assigns a roll number to the carpet and affixes a label with that number onto the carpet. He enters the carpet roll number into the computer's data base by using the Assign Roll operation (FIG. 11) on the radio terminal 22. If the computer sees that the roll number is a duplicate, the operator is notified on the hand-held scanner to change it so that no two carpets have the same roll number.

If a quality problem, such as a dye streak, occurs in the carpet at any later time, the tuft rows are counted to ascertain in which row number(s) the quality problem occurs. From the tuft row number(s) and carpet roll number, the computer 26 calculates which needle(s) knitted the offending tuft row(s) and which yarn package(s) caused the quality problem. The yarn manufacturer can then be contacted for help in resolving the quality problem.

What is claimed is:

1. A method of identifying with the aid of a computer having a data base, each yarn in a fabric made on a machine after the fabric is removed from the machine, said machine having needles supplied with individual sources of said yarn located on positions of a creel wherein each position and location on the creel is associated with a particular needle, said method comprising:

identifying said individual sources of said yarn with a first label, said label having indicia correlated to yarn properties;

identifying said individual positions and locations on said creel with a second label;

identifying said fabric with a third label;

providing information from said first, second and third labels to the data base of the computer, said information including the identity of each fabric, individual yarn source, the individual positions and locations on the creel of each individual yarn source and the particular needle associated with each position and location for making said fabric on said machine during the time that the fabric is manufactured; and recalling said information from said data base by time period for said fabric, whereby nonuniformity in specific locations of the fabric caused by yarn can be identified with the needle producing fabric at said specific locations of the fabric where the nonuniformity occurred which in turn can be identified with the locations on the creel associated with said needle which then in turn can be identified with the yarn source positioned on said location on the creel.

2. The method of claim 1, said labels being machine readable bar code labels, said labels being scanned with a radio frequency laser scanner; said radio frequency laser scanner providing said information to said data base of said computer.

* * * * *